(12) United States Patent
Siemens et al.

(10) Patent No.: US 6,925,073 B2
(45) Date of Patent: Aug. 2, 2005

(54) CORDLESS VOICE AND DATA APPLICATION IN A BROADBAND GATEWAY

(75) Inventors: Gerhard Siemens, Borken (DE); Kevin Duffy, Austin, TX (US)

(73) Assignee: Siemens Communications, Inc., Boca Raton, FL (US)

( * ) Notice: Subject to any disclaimer, the term of this patent is extended or adjusted under 35 U.S.C. 154(b) by 802 days.

(21) Appl. No.: 09/790,439

(22) Filed: Feb. 21, 2001

(65) Prior Publication Data

US 2002/0114300 A1 Aug. 22, 2002

(51) Int. Cl.⁷ ............................................. H04B 7/212
(52) U.S. Cl. ..................................... 370/337; 370/401
(58) Field of Search ............................. 370/310, 314, 370/326, 328, 337, 347, 349, 352–353, 395.5, 395.52, 395.53, 401, 465–466, 471, 474, 280

(56) References Cited

U.S. PATENT DOCUMENTS

| | | | |
|---|---|---|---|
| 5,555,258 A | 9/1996 | Snelling et al. ............. | 370/280 |
| 6,078,574 A | 6/2000 | Boetzel et al. .............. | 370/337 |
| 6,088,338 A | 7/2000 | Rossella et al. ............ | 370/294 |
| 6,243,577 B1 * | 6/2001 | Elrefaie et al. ........... | 455/426.2 |
| 2002/0059434 A1 * | 5/2002 | Karaoguz et al. ........... | 709/228 |
| 2002/0089971 A1 * | 7/2002 | Shih ........................... | 370/352 |
| 2004/0047358 A1 * | 3/2004 | Chen et al. ................. | 370/401 |

FOREIGN PATENT DOCUMENTS

| | | |
|---|---|---|
| EP | 0 797 366 A2 | 9/1997 |
| WO | WO 01 09739 A | 2/2001 |
| WO | WO 01 93048 A | 12/2001 |

OTHER PUBLICATIONS

European Telecommunication Standard, "Radio Equipment and Systems (RES); Digital European Cordless Telecommunications (DECT) Common Interface, Part 2: Physical Layer", ETS 300 175–2, Oct. 1992.

European Telecommunication Standard, "Radio Equipment and Systems (RES); Digital European Cordless Telecommunications Common Interface", ETS 300 175–3, Oct. 1992.

Seo, et al., "An Implementation of VoIP Cable Modem," IEEE, 1999, pp. 1532–1535, XP010368558.

\* cited by examiner

*Primary Examiner*—John Pezzlo
*Assistant Examiner*—Saba Tsegaye

(57) ABSTRACT

A broadband gateway that communicates with a broadband computer network and narrow band cordless devices is provided. The gateway houses together a connector to a broadband network, which is connected to a broadband modem. The broadband modem provides a broadband computer network outlet. The broadband modem is also connected to a narrow band cordless device. The narrow band cordless device may be formed by a translation board connected to the broadband modem, a microprocessor connected to the translation board, a burst mode controller connected to the microprocessor and the translation board, and a transceiver electrically connected to the burst mode controller. A codec device may also be connected to the burst mode controller to allow the use of a conventional telephone.

17 Claims, 4 Drawing Sheets

CORDLESS VOICE AND DATA APPLICATION IN A BROADBAND GATEWAY

BACKGROUND OF THE INVENTION

The present invention relates to communication gateways. More specifically, the present invention relates to communication gateway adapters.

Time division multiple access (TDMA) cordless phone systems provide a base unit, which is able to provide connections for a plurality of mobile units, such as handsets. Such TDMA systems use time division to provide a plurality of slots, where the base (fixed part (FP)) transmits to an individual (portable part (PP)) mobile unit during a particular slot of time and receives from the individual mobile unit during a particular slot of time. Some TDMA standards may be WDCT, HOME-RF, and Bluetooth. One standard for TDMA systems is the Digital European Cordless Telecommunications DECT Common interface standard described in ETS 300 175-2 and ETS 300 175-3, published by the European Telecommunication Standards Institute. The DECT standard is also discussed in U.S. Pat. No. 6,078,574 entitled "PROCESS AND APPARATUS FOR ACTION CONTROL IN A TIME SLOT METHOD", to Boetzel et al. issued Jun. 20, 2000 and U.S. Pat. No. 6,088,338 entitled "METHOD AND SYSTEM FOR THE DETERMINATION OF THE PSCN PARAMETER STARTING FROM THE MFN PARAMETER IN A DECT CORDLESS TELEPHONE SYSTEM" to Rossella et al. issued Jul. 11, 2000, which are incorporated by reference. Such systems may be used in households and small businesses. Such systems may be considered as narrow band applications, since the data transmitted along less channels than a broadband cable system. More specifically, a narrowband system may be defined as having all of the narrowband applications sharing a single channel.

In households, small businesses, and remote office branch offices it may be desirable to have a broadband network with a broadband gateway, which may provide more than one channel over a single wire. Such a broadband network may be a network linking computers and allowing the transfer of a large capacity of data between computers. Allowing a high capacity transfer of data may allow quicker surfing of the World Wide Web, the reception of video, or the downloading of computer files. Such broadband gateways may be difficult to install. Telephone companies may calculate several hours of work to make such gateways work as the customer expects them to work.

Providing separate cordless telephone connections and broadband connections increases complexity in wiring.

It would be desirable to provide a plug and play gateway for households, small office home offices, small businesses, and remote office branch offices that provides both cordless narrow band communication and broadband communication for voice and data transfers that is easy to install.

SUMMARY OF THE INVENTION

To achieve the foregoing and other objects and in accordance with the purpose of the present invention a plug and play gateway is provided. A housing supports a broadband connector. A broadband modem, supported by the housing, is electrically connected to the broadband connector. A broadband outlet, supported by the housing, is electrically connected to the broadband modem. A narrow band cordless device, supported by the housing, is electrically connected to the broadband modem.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
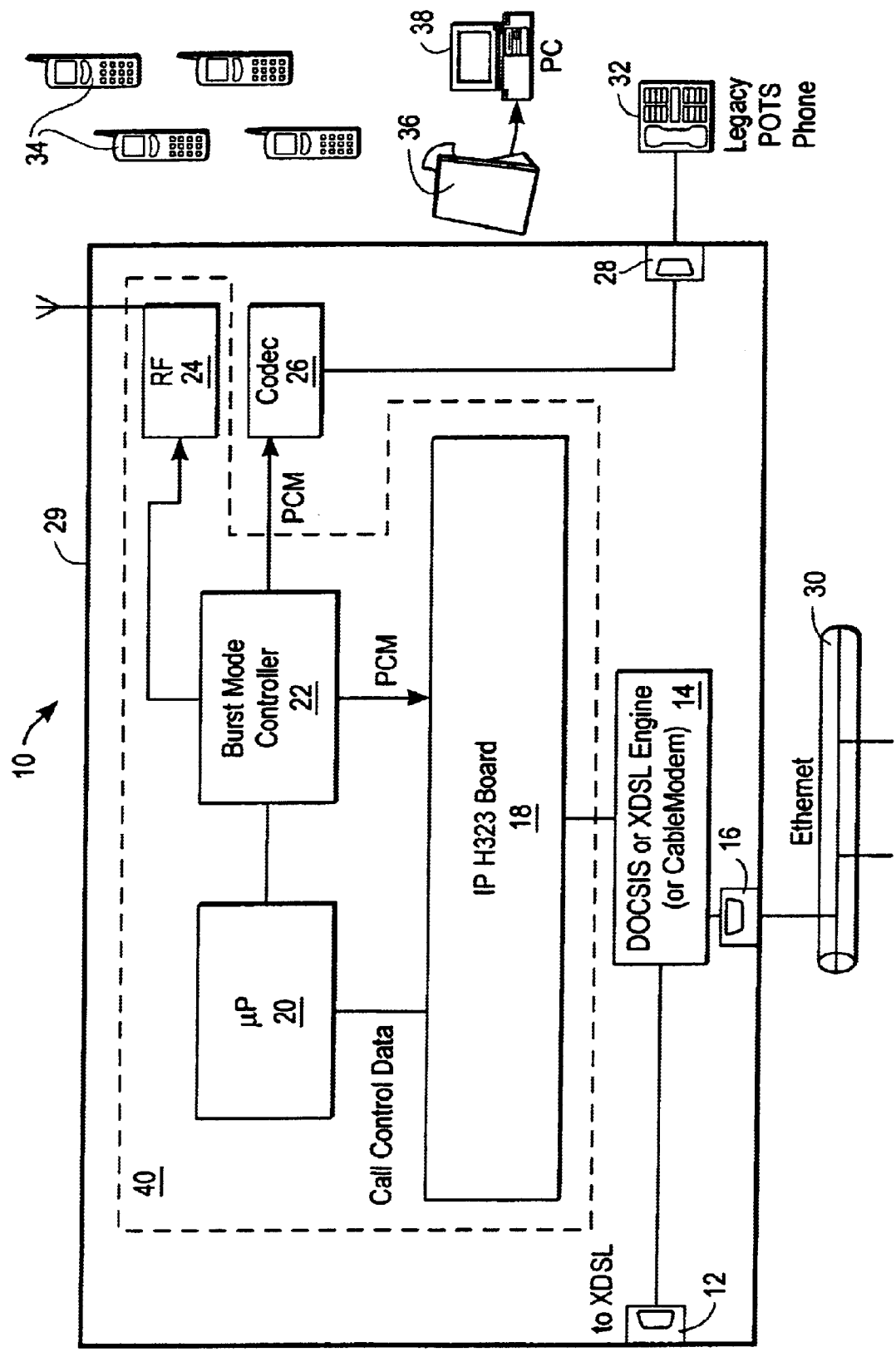
FIG. 1 is a schematic view of a plug and play gateway.

To facilitate discussion, FIG. 1 is a schematic view of a gateway 10 provided in a preferred embodiment of the invention. The gateway has a broadband connector 12. Generally, broadband transmissions provide more channels than narrowband transmissions. More specifically, broadband transmissions may allow several channels to be carried at once on a single wire. The broadband connector 12 is electrically connected to a broadband modem 14. The broadband modem 14 is a high capacity modem, such as an xDSL (any DSL, such as ADSL and VDSL or Data Over Cable Systems Interface Specifications (DOCSIS1.0, 1.1) modem or a cable modem, which is able to handle several channels at once. The broadband modem 14 is connected to a wired broadband outlet 16. The broadband modem 14 is also connected to a translation board 18. The translation board 18 translates packets from the broadband modem 14 into packets useful to a narrow band system. In the preferred embodiment the translation board is able to handle packets which conform to the H.323 standard approved by the International Telecommunications Union, so that the translation board 18 is an IP H.323 board. The translation board 18 is connected to a microprocessor 20 and a burst mode controller 22. The burst mode controller 22 is connected to a wireless transceiver 24 and a codec device 26. The codec device 26 is electrically connected to a telephone outlet 28. The broadband modem 14, translation board 18, microprocessor 20, burst mode controller 22, wireless transceiver 24, and codec device 26 are contained within and supported by a housing 29 which also supports the broadband connector 12, the broadband outlet 16, and the telephone outlet 28. The translation board 18, microprocessor 20, burst mode controller 22, and wireless transceiver 24 form a narrow band cordless device 40 for transmitting and receiving narrow band wireless signals.

To set up the gateway 10, the broadband connector 12 is electrically connected to a broadband network. The broadband network may be a DSL network or a cable network or another high capacity multichannel network. The wired broadband outlet 16 may be connected to a wired broadband computer network 30, such as a wired Ethernet network or another type of wired local area network (LAN) preferably through a physical cable, such as a wire, fiber optic, or similar physical connection. The wired computer network 30 may connect one or more computing devices to the gateway 10. An analog (POTS) plain old telephone service) telephone device 32 may be connected to the telephone outlet 28. Wireless devices, such as digital wireless handsets 34 and a wireless modem 36 connected to a computing device 38 may communicate with the wireless transceiver 24 and are assigned time slots by the microprocessor 20. In the preferred embodiment the wireless handsets 34 and wireless modem 36 use electromagnetic signals such as microwave or radio frequency signals to communicate with the wireless transceiver 24.

Figure 2:
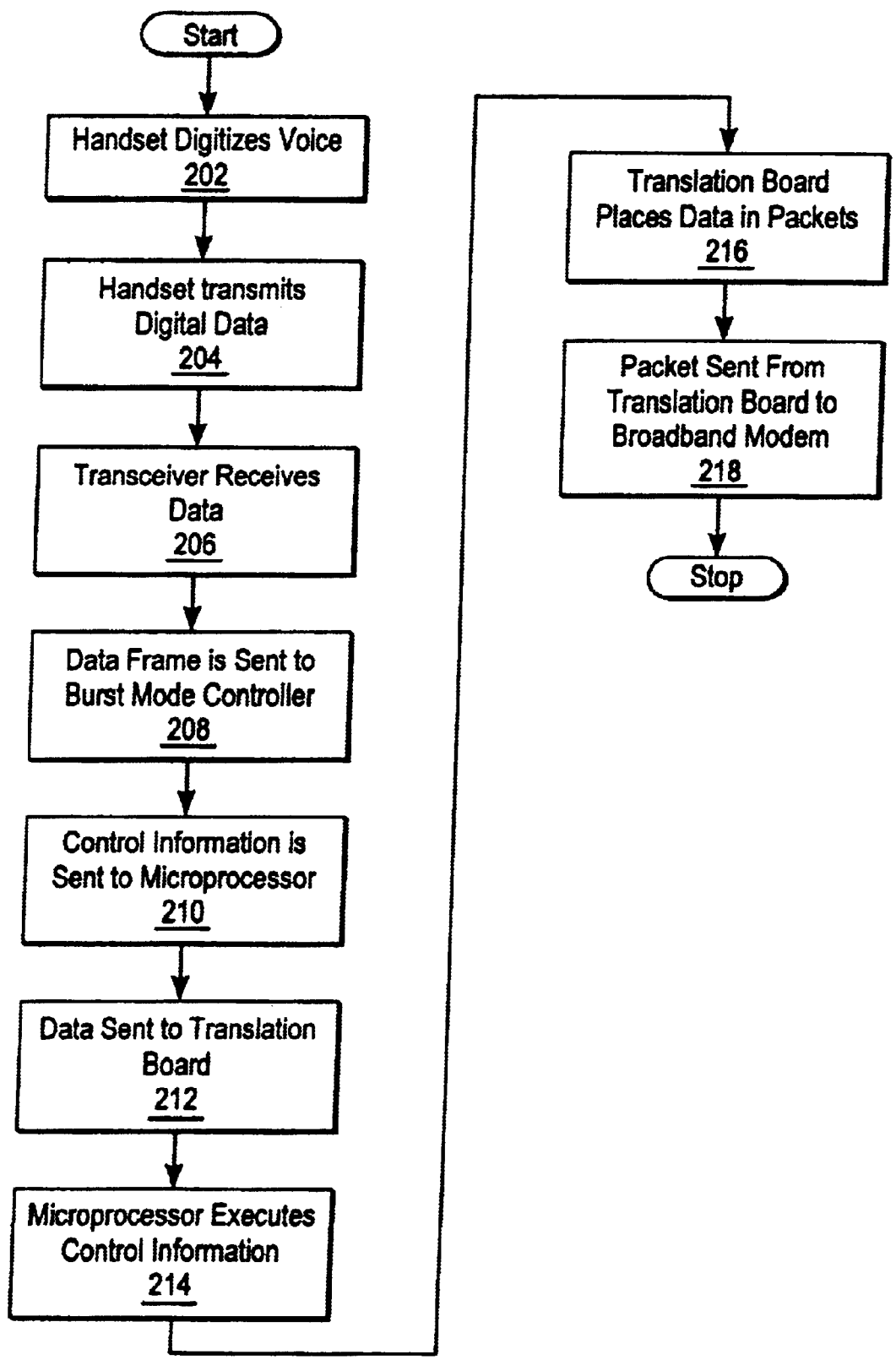
FIG. 2 flow chart of a process for digitizing and sending audio information in an embodiment of the invention.
Figure 3:
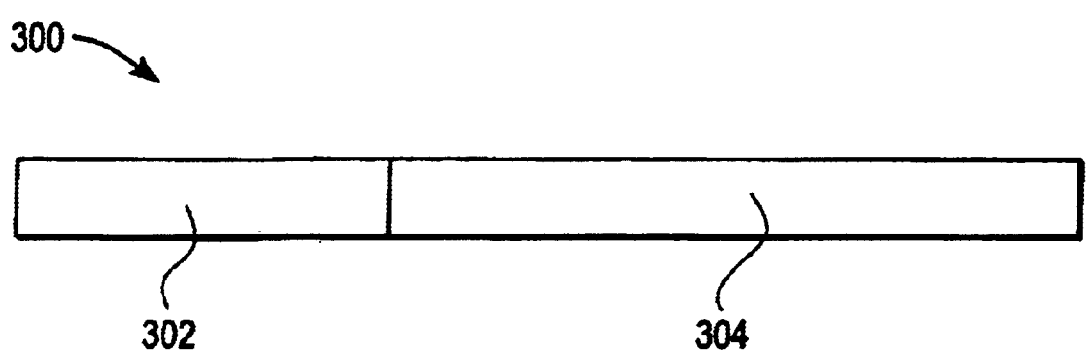
FIG. 3 is schematic illustration of a frame used in an embodiment of the invention.

In operation to facilitate understanding, FIG. 2 is a flow chart of communications for messages generated by a digitized wireless handset 34. Sound, such as a voice, may be digitized by the digital wireless handset 34 (step 202). In a preferred embodiment of the invention, the handset 34 places the digitized voice in a Digital European Cordless Telecommunications (DECT) frame structure, according to the DECT Common interface standard described in ETS 300 175-2 and ETS 300 175-3, published by the European Telecommunication Standards Institute. Such frame structures place the digitized voice into frames 300 with control fields 302 and data fields 304, as shown in FIG. 3. The digital wireless handset 34 may transmit digital data as an electromagnetic signal (step 204). The wireless transceiver 24 may receive the electromagnetic signal (step 206) and reconstruct the digital data frame. The digital data frame may be sent from the wireless transceiver 24 to the burst mode controller 22 (208), where the digital data frame may 300 may be divided, so that control information in control fields 302 is sent to the microprocessor 20 (step 210) and data in the data fields 304 is sent to the translation board 18 (step 212). The microprocessor 20 may process some of the control information in the control fields 302, which may cause the microprocessor 20 to act on the data in the translation board 18 and may allow the microprocessor to provide instructions to the translation board 18 on how to package or frame the data in the data fields (step 214). In the preferred embodiment the translation board 18 places the data in an IP packet (step 216). The packet may be sent from the translation board 18 to the broadband modem 14 (step 218), which may transmit the packet over the broadband network.

Figure 4:
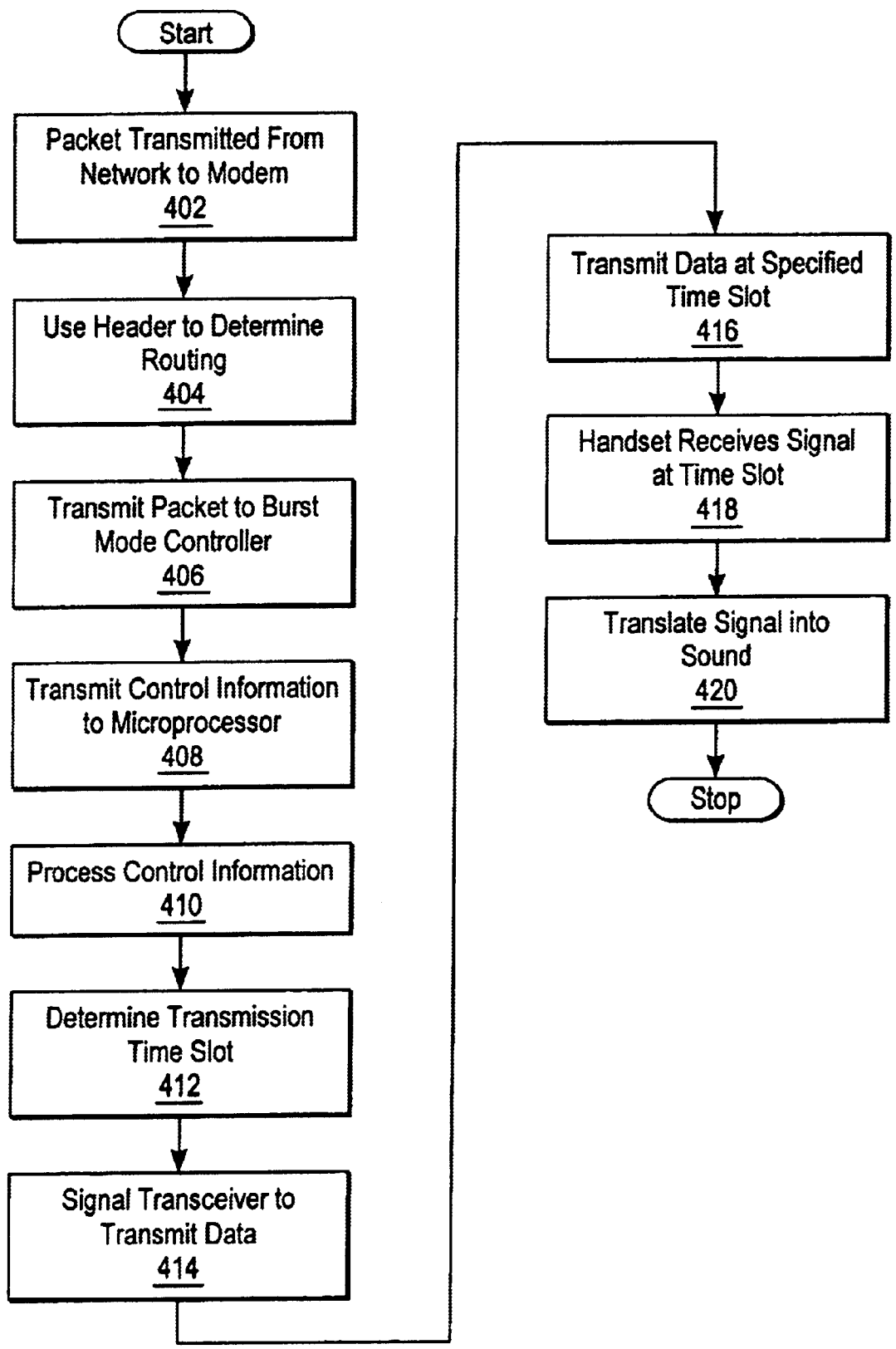
FIG. 4 is a flow chart of a process for receiving a digitized audio packet.

FIG. 4 is a flow chart of communications for messages sent to a digitized wireless handset 34. A packet, such as an IP packet may be transmitted from the broadband network through the broadband connector 12 to the broadband modem 14 (step 402). Header information in the IP packet may indicate that the packet has data for a digital wireless handset 34. The broadband modem 14 may use the information in the header to determine that the packet is to be routed to the translation board 18 (step 404). The translation board 18 may transmit the packet to the burst mode controller 22 (step 406). The burst mode controller 22 may transmit control information in the packet to the microprocessor 20 (step 408), which processes the control information (step 410). Since in the preferred embodiment the frame structure for the digital wireless handsets 34 may be DECT frame structure, the digital wireless handsets 34 use Time division multiple access (TDMA). TDMA may be used, since the narrow band cordless device 40 is narrow band, and therefore may only handle one channel at a time for each wire. Time division allows multiple devices to share the single channel. Therefore the microprocessor 20 may determine from the control information in the packet during which time slot the data should be transmitted (step 412). The microprocessor 20 may then have the burst mode controller 22 signal to the transceiver 24 when to transmit the digital data via an electromagnetic signal to a digital wireless handset 34 (step 414). The transceiver 24 may transmit the data at the specified time slot (step 416). The target handset 34 then may receive the signal at the particular time slot (418). The handset 34 translates the signal to an audio sound (step 420).

Data transmitted to and from the wireless modem 36 may be treated similarly to data transmitted to and from the digital wireless handsets 34. The same time division for assigning a time slot to the digital wireless handsets 34 may also be used for the wireless modem 36 in order to allow the digital wireless handsets 34 and the wireless modem 36 to share the same transceiver 24 on the same channel. Instead of the data being digitized audio data, the data may be standard computer digital data. Since the wireless modem 36 shares the transceiver with the handsets 34 data through the wireless modem 36, which uses time division to share a single channel the wireless modem 36 is narrow band. The translation board 18, microprocessor 20, burst mode controller 22 and transceiver 24 form the narrow band cordless device 40, which allows the handsets 34 and wireless modem 36 to share the same time divided channel and to communicate through the broadband modem 14 to the broadband network.

When the telephone 32 is used, an analog signal from the telephone 32, representing audible sound, passes through the telephone outlet 28 to the codec 26. The codec 26 may digitize and compress the analog signal and place the resulting digital signal into a DECT frame structure. The codec 26 may then pass the digital data frame to the burst mode controller 22 during an assigned time slot, where the digital data frame may 300 may be divided, so that control information in control field 302 is sent to the microprocessor 20 and data in the data fields 304 is sent to the translation board 18. The microprocessor 20 may process some of the control information in the control fields 302, which may cause the microprocessor 20 to act on the data in the translation board 18 and may allow the microprocessor to provide instructions to the translation board 18 on how to package or frame the data in the data fields. In the preferred embodiment the translation board 18 places the data in an IP packet. The packet is sent from the translation board 18 to the broadband modem 14, which transmits the packet over the broadband network. For data being received from the broadband network, control data informs the microprocessor 20 that the data should be directed to the codec 26, which decompresses the data and translates the data into an analog signal. The analog signal is transmitted to the telephone 32, which turns the analog signal into sound.

Data that comes through the wired computer network 30 in the preferred embodiment of the invention is in the form of a TCP/IP packet. Such packets are passed through the broadband outlet 16 to the broadband modem 14. The broadband modem 14 may provide an additional header and footer around the TCP/IP packet and then transmit the packet through the broadband connector 12 to the broadband network. Similarly, data received from the broadband network through the broadband connector 12 to the broadband modem 14, may be in the form of a TCP/IP packet. The broadband modem 14 may add and strip headers and footers from the TCP/IP packet and may then pass the packet through the broadband outlet to a computer on the computer network 30. The computer network 30 may allow high capacity broadband communication. The invention provides a gateway that converts audio messages in a TDMA system into IP packets, which are transferred to a broadband network with IP packets from a computer network or other devices connected to the gateway.

While this invention has been described in terms of several preferred embodiments, there are alterations, permutations, and substitute equivalents which fall within the scope of this invention. It should also be noted that there are many alternative ways of implementing the methods and apparatuses of the present invention. It is therefore intended that the following appended claims be interpreted as including all such alterations, permutations, and substitute equivalents as fall within the true spirit and scope of the present invention.

What is claimed is:

1. An apparatus for providing broadband and cordless narrow band communication, comprising:
    a broadband connector;
    a broadband modem electrically connected to the broadband connecter;
    a broadband outlet electrically connected to the broadband modem; and
    a narrow band cordless device electrically connected to the broadband modem that includes a translation board electrically connected to the broadband modem, a microprocessor electrically connected to the translation board, a burst mode controller electrically connected to the microprocessor and the translation board, and an electromagnetic transceiver electrically connected to the burst mode controller.

2. The apparatus, as recited in claim 1 further comprising:
    a codec device, supported by the housing and electrically connected to the burst mode controller; and
    a telephone outlet supported by the housing and electrically connected to the codec device.

3. The apparatus, as recited in claim 2, wherein the microprocessor is programmed to receive control data from the translation board and command the burst mode controller to place data in a time slot.

4. The apparatus, as recited in claim 3, further comprising a plurality of digital cordless handsets which are able to electromagnetically communicate with the electromagnetic transceiver.

5. The apparatus, as recited in claim 4, wherein time division multiple access is used to allow the plurality of digital cordless handsets to communicate with the electromagnetic transceiver.

6. The apparatus, as recited in claim 5, wherein the broadband outlet is a cable connection.

7. The apparatus, as recited in claim 6, further comprising at least one wireless modem which is able to electromagnetically communicate with the electromagnetic transceiver.

8. The apparatus, as recited in claim 7, wherein the handsets communicate with the transceiver using electromagnetic signals with frequencies in the range from radio waves to microwaves.

9. The apparatus, as recited in claim 1, wherein the microprocessor is programmed to receive control data from the translation board and command the burst mode controller to place data in a time slot.

10. The apparatus, an recited in claim 1, further comprising a plurality of digital cordless handsets which are able to electromagnetically communicate with the electromagnetic transceiver.

11. The apparatus, as recited in claim 10, wherein time division multiple access is used to allow the plurality of digital cordless handsets to communicate with the electromagnetic transceiver.

12. The apparatus, as recited in claim 11, wherein the broadband outlet is a cable connection.

13. The apparatus, as recited in claim 12, further comprising at least one wireless modem, which is able to electromagnetically communicate with the electromagnetic transceiver.

14. A method for providing broadband and cordless narrow band communication, comprising:
    providing a broadband connector;
    electrically connecting a broadband modem to the broadband connector;
    electrically connecting a broadband outlet to the broadband modem; and
    electrically connecting a narrow band cordless device to the broadband modem wherein the narrow band cordless device includes a translation board electrically connected to the broadband modem, a microprocessor electrically connected to the translation board, a burst mode controller electrically connected to the microprocessor and the translation board, and an electromagnetic transceiver connected to the burst mode controller.

15. The method as recited in claim 14, further comprising:
    electrically connecting a codec device to the burst mode controller; and
    electrically connecting a telephone outlet to the codec device.

16. The method as recited in claim 14
    programming the microprocessor to receive control data from the translation board and command the burst mode controller to place data in a time slot.

17. The method as recited in claim 14, further comprising a plurality of digital cordless handsets which are able to electromagnetically communicate with the electromagnetic transceiver.

* * * * *